United States Patent
Leduc

(10) Patent No.: US 6,858,194 B2
(45) Date of Patent: Feb. 22, 2005

(54) METHOD FOR REDUCING ELEMENTARY HALOGEN IN A GASEOUS EFFLUENT

(75) Inventor: Philippe Leduc, Saint Sorlin (FR)

(73) Assignee: Arkema, Puteaux (FR)

( * ) Notice: Subject to any disclaimer, the term of this patent is extended or adjusted under 35 U.S.C. 154(b) by 51 days.

(21) Appl. No.: 10/148,847

(22) PCT Filed: Dec. 1, 2000

(86) PCT No.: PCT/FR00/03363

§ 371 (c)(1),
(2), (4) Date: Aug. 26, 2002

(87) PCT Pub. No.: WO01/41903

PCT Pub. Date: Jun. 14, 2001

(65) Prior Publication Data

US 2003/0044336 A1 Mar. 6, 2003

(30) Foreign Application Priority Data

Dec. 7, 1999 (FR) .............................. 99 15412

(51) Int. Cl.⁷ ................................. A62D 3/00
(52) U.S. Cl. ................................. 423/241; 423/240 R
(58) Field of Search .................. 423/240 R, 240 S, 423/241, 245.1, 245.2, 245.3; 588/248

(56) References Cited

U.S. PATENT DOCUMENTS

| 2,787,525 A | | 4/1957 | De Witt ....................... 23/154 |
| 4,344,200 A | | 8/1982 | Farr et al. .................... 14/71.5 |
| 4,843,979 A | | 7/1989 | Phillips ....................... 110/215 |
| 4,892,719 A | * | 1/1990 | Gesser ....................... 423/245.1 |
| 5,057,207 A | * | 10/1991 | Basler ....................... 208/262.1 |
| 5,130,031 A | * | 7/1992 | Johnston ....................... 210/748 |
| 5,196,617 A | | 3/1993 | Kovenklioglu et al. ..... 570/204 |
| 5,352,420 A | * | 10/1994 | Kurzinger et al. .......... 423/210 |
| 5,531,901 A | * | 7/1996 | Miyabe et al. .............. 210/668 |
| 6,117,335 A | * | 9/2000 | Bender ....................... 210/745 |

FOREIGN PATENT DOCUMENTS

| DE | 43 44 200 | 6/1995 |
| FR | 1 473 585 | 9/1967 |
| FR | 2 439 941 | 6/1980 |

OTHER PUBLICATIONS

International Search Report corresponding to PCT/FR00/03363 dated Mar. 23, 2001.

U. Klinkhart, "Incineration of Chlorinated Hydrocarbons and the Recovery of HCl", *Symposium of the Institute of Chemical Engineers*, London, May 2, 1974.

* cited by examiner

*Primary Examiner*—Stanley S. Silverman
*Assistant Examiner*—Edward M. Johnson
(74) *Attorney, Agent, or Firm*—Millen, White, Zelano & Branigan, P.C.

(57) ABSTRACT

Disclosed are a method for reducing the elementary halogen contained in a gaseous effluent from a combustion furnace by bringing the effluent into contact with hydrazine, and a device or an installation for treating a gaseous effluent from a combustion furnace, and a solution of halohydric acid containing hydrazine.

20 Claims, 5 Drawing Sheets

METHOD FOR REDUCING ELEMENTARY HALOGEN IN A GASEOUS EFFLUENT

The present invention relates to a novel process for reducing the elementary halogen contained in a gaseous or liquid effluent, as well as an installation for its implementation, particularly within the scope of a process for reclaiming chlorinated residues. Finally, the invention relates to a hydrohalogenic acid composition containing hydrazine.

Conventionally, organic synthesis residues are destroyed by combustion. The combustion of halogenated residues, in particular chlorinated residues, poses difficulties due to the fact that the combustion gases contain elementary chlorine (or free chlorine) and hydrochloric acid, which must not be discharged into the atmosphere. Conventionally, the hydrochloric acid is absorbed in water. The free chlorine as well as traces of HCl are then eliminated by neutralisation with soda. However, on the one hand, some elementary chlorine always remains dissolved in the acid solution and, on the other hand, some elementary chlorine remains in the vent holes, which must be eliminated before discharging into the atmosphere. However, the soda used for this purpose produces large amounts of salts, which leads to other treatment problems.

The document "Incineration of chlorinated hydrocarbons and the recovery of HCl", by U. Klinkhart, Symposium of the Institute of Chemical Engineers, London, 2 May 1974 outlines different techniques for purifying combustion gases and eliminating elementary chlorine. This document describes a process in which the combustion gases are treated by quenching in water or in a hydrochloric acid solution. These gases are then conveyed towards an absorption column (isothermic or adiabatic) for the production of acid, the gaseous effluents from this column being treated in a scrubbing tower by reaction with caustic soda. However, the combustion gases contain a considerable amount of $CO_2$; the soda used to neutralise the elementary chlorine thus reacts and leads to the production of large quantities of sodium carbonate and bicarbonate. At the outlet of the unit, large quantities of salts are thus produced.

Patent applications FR-A-1473585 and FR-A-2439941 relate to improved processes and installations designed to produce combustion gases containing the lowest possible amount of chlorine in elementary form. In patent application FR-A-1473585, in order to attain a level of elementary chlorine of around several ppm in the gas coming from the combustion, it is necessary to inject excess water (in the form of steam) into the combustion furnace. In patent application FR-A-2439941, in order to attain a level of elementary chlorine of around several ppm in the gas coming from the combustion, it is necessary to inject methane into the cooling zone (at the quenching level). These injections pose numerous problems, particularly as regards the size of the furnace, the complexity of the installation and its operation. Finally, it always necessarily produces a small quantity of chlorine, through the Deacon equilibrium.

U.S. Pat. No. 2,787,525 relates to a process for eliminating elementary chlorine from hydrochloric acid by the addition of hydrazine.

German patent application n° 4 344 200 relates to a process for preparing acid from a combustion gas containing bromine or iodine. The combustion gas is absorbed in water or dilute acid and the acid solution obtained thereof is reduced using a reducing agent, which may be hydrazine.

U.S. Pat. No. 4,843,979 relates to an incineration system for the destruction of hazardous waste products in which hydrazine is used to reduce the metal oxides into metals.

There is therefore a need for a process that enables elementary chlorine to be eliminated from combustion gases without having to resort to a complex installation and without producing large amounts of saline waste.

None of the aforesaid documents teach or suggest the present invention.

Thus, the invention provides a process for reducing the elementary halogen contained in an effluent, in which this effluent is brought into contact with hydrazine.

According to one embodiment, the effluent is a gaseous effluent.

According to one embodiment, the effluent is brought into contact with an aqueous solution of hydrazine.

According to one embodiment, the gaseous effluent is a gaseous effluent from a combustion furnace for combusting halogenated residues.

According to one embodiment, the effluent is a hydrohalogenic acid solution in which elementary halogen is dissolved, which is brought into contact with an aqueous solution of hydrazine.

According to one embodiment, the aqueous solution of hydrazine contains a hydrohalogenic acid solution.

According to one embodiment, the halogen is chlorine.

According to one embodiment, the quantity of hydrazine used is stoichiometrically between 0.2 and 2 times the amount of elementary halogen, and preferably between 0.8 and 1.2.

Moreover, the invention proposes a device or an installation for treating a gaseous effluent from a combustion furnace for combusting halogenated residues, which comprises a unit in which the gases are brought into contact with an aqueous solution of hydrazine.

According to one embodiment, said unit is a quenching reactor (6) at the outlet of the furnace (1), in which the combustion gases are brought into contact with an aqueous solution of hydrazine.

According to one embodiment, the quenching reactor (6) is an absorption column.

According to one embodiment, the aqueous solution of hydrazine is introduced via the duct (19).

According to one embodiment, the aqueous solution of hydrazine comprises a hydrohalogenic acid solution that is placed in a re-circulation loop (7).

According to one embodiment, the hydrazine is introduced via the duct (18).

According to one embodiment, said unit (6, 10, 14) is a HCl column (10) connected to the outlet of a quenching reactor (6) at the outlet of the furnace (1).

According to one embodiment, the aqueous solution of hydrazine is introduced via the duct (20).

According to one embodiment, said unit (6, 10, 14) is a scrubbing column (14) connected to the outlet of a HCl column (10), itself connected to the outlet of a quenching reactor (6) at the outlet of the furnace (1).

According to one embodiment, the aqueous solution of hydrazine is introduced via the duct (22).

Finally, the invention proposes a hydrohalogenic acid solution containing hydrazine in an amount of between 10 and 1000 mg/l, preferably between 50 and 500 mg/l.

According to one embodiment, the acid content is between 15 and 40%, advantageously between 20 and 35%.

According to one embodiment, the acid is hydrochloric or hydrobromic acid.

The invention will now be described in more detail in the description that follows, given for hydrochloric acid, but which in fact applies to any other incinerator of residues (halogenated or not).

Figure 1:
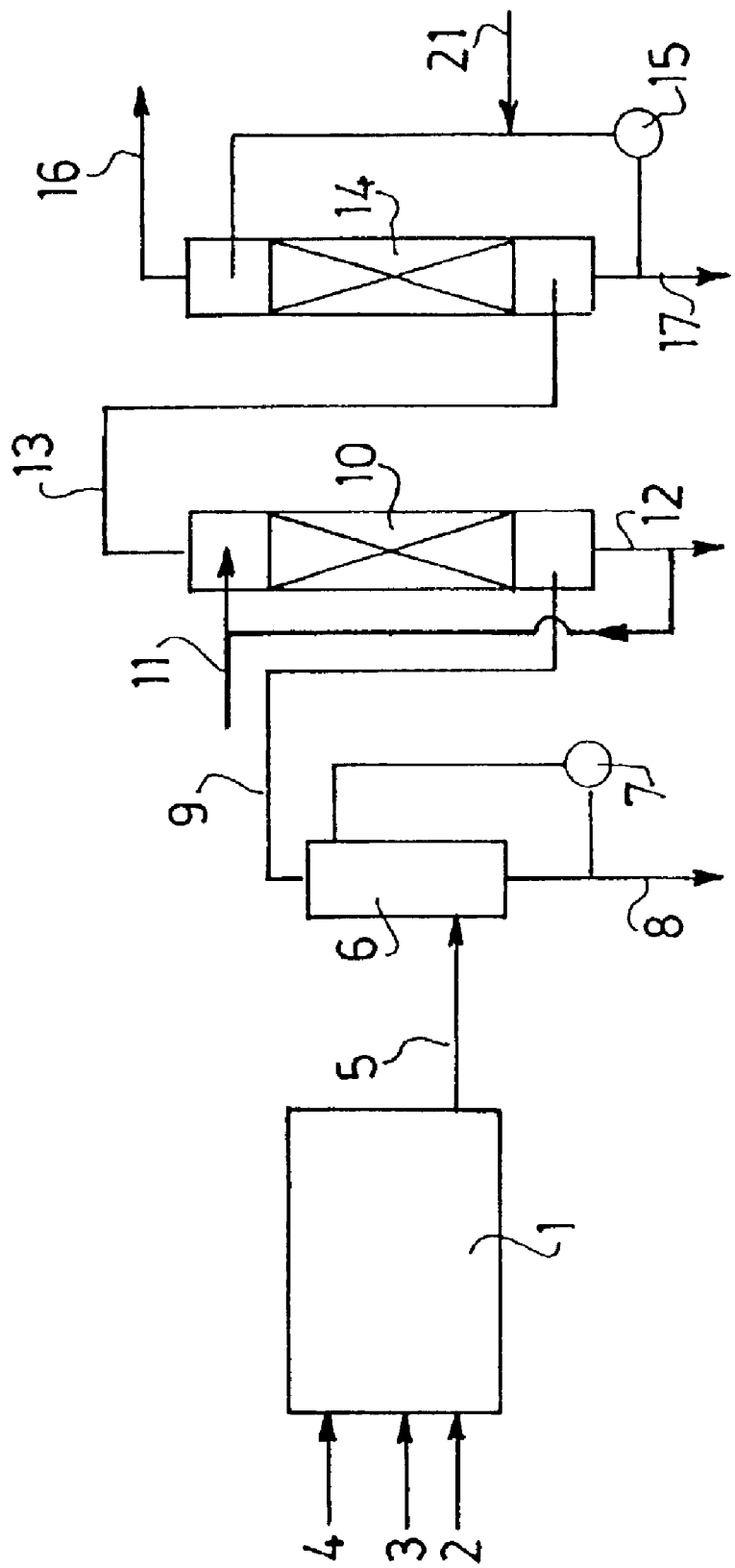
FIG. 1 is a diagram of an installation for treating chlorinated residues according to the prior art.

The operation of the installation for treating chlorinated residues according to the prior art is described in referring to FIG. 1. The furnace 1 is supplied with chlorinated residues 2, oxygen 3 and water 4. The source of oxygen may be air or any gas containing oxygen. The temperature of the furnace is conventional, for example 900–1200° C.; the dwell time is also conventional, for example around 3 s. The conventional combustion reaction of chlorinated residues takes place in the furnace, namely:

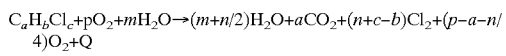

$C_aH_bCl_c + pO_2 + mH_2O \rightarrow (m+n/2)H_2O + aCO_2 + (n+c-b)Cl_2 + (p-a-n/4)O_2 + Q$ In accordance with the Deacon equilibrium, after combustion one obtains:

$2\ HCl + \tfrac{1}{2}O_2 \leftrightarrows H_2O + Cl_2 - 20.8\ \text{kcal}$ (Exothermal from Left to Right)

The gases, containing H₂O, HCl, Cl₂ and O₂ (and possibly nitrogen in the conventional case where the oxidant is air) exit via the duct 5. These gases then enter the quenching reactor 6, which may be assimilated to a hydrochloric acid re-circulation column. This quenching reactor is preferably an absorption column. The temperature in the quenching reactor is low, for example 60–80° C. The purpose of sharply cooling the gas is to limit the formation of elementary chlorine, in accordance with the Deacon equilibrium (see above). The re-circulation loop 7 contains a hydrochloric acid solution, whose concentration depends on the temperature and the pressure, and is for example 30%. The bleed 8 enables soot and metals in particular to be eliminated. One may also envisage the quenching taking place in a column, especially a counter-current column, the cooling fluid injected into the column being, in this case, water or a solution of hydrochloric acid for example at a concentration of less than 30%. The cooled combustion gases are evacuated via the duct 9.

These gases go into the HCl column 10. This column is supplied with re-circulated HCl and diluted beforehand by the water fed via the duct 11. 33% hydrochloric acid (commercial grade) is recovered at the bottom via the duct 12. However, this acid is contaminated with a small amount of chlorine from the combustion gases that dissolves in the acid solution and which affects its commercial quality. The gases leave the HCl column via the duct 13, and comprise at this stage Cl₂, CO₂ and O₂, as well as traces of HCl (and possibly nitrogen).

These gases go into the soda column (for example a scrubbing column) 14. This column is supplied with soda NaOH via a re-circulation loop 15 and its concentration in soda is maintained constant by means of a soda feed via the duct 21. This column firstly neutralises the excess HCl and part of the CO₂ coming out of the previous column and secondly, and most importantly, eliminates the chlorine before discharging into the atmosphere, the level of chlorine being maintained, according to the legislation in force, at a concentration below 5 ppm in the discharged gases. The gases CO₂ and O₂ (and possibly nitrogen) are thus discharged via the duct 16. The duct 17 evacuates the salts formed in the soda column, namely NaCl, NaOCl, Na₂CO₃, NaHCO₃, as well as the excess soda NaOH that has not been used up. The consumption of soda is therefore high, especially due to the presence of large quantities of carbon dioxide gas in the combustion gases, which reacts with the soda to form carbonates and bicarbonates.

It is therefore clear that this installation is overcomplex and suffers from the numerous aforesaid disadvantages.

Figure 2:
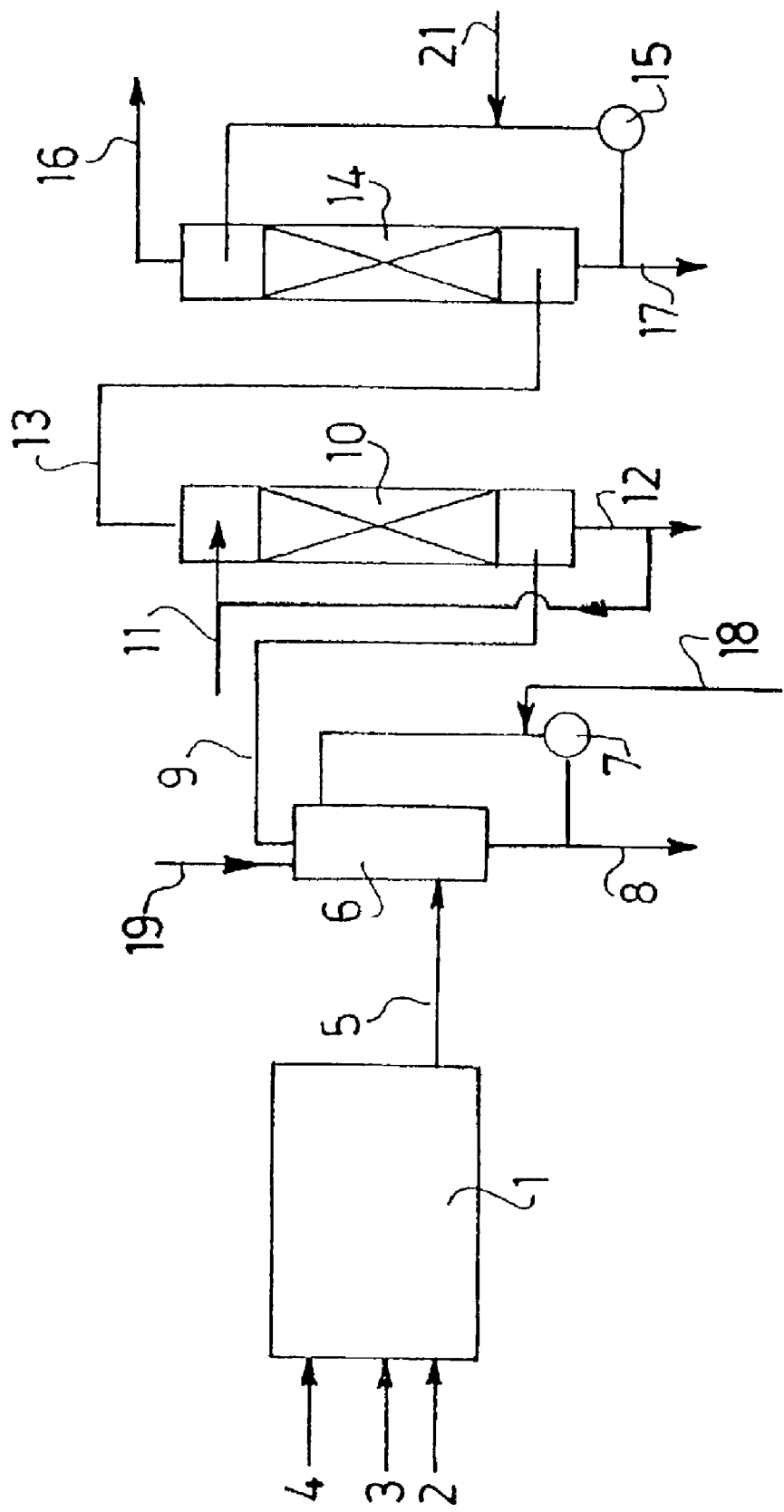
FIG. 2 is a diagram of an installation for treating chlorinated residues according to one embodiment of the invention.

The operation of the installation for treating chlorinated residues according to a first embodiment of the invention is described in reference to FIG. 2. The furnace 1 and its feed ducts are identical to those described in FIG. 1. In the same way, the quenching column is identical to the previous column. The feed to the column is however modified so that the hydrazine (in the form of hydrate) may be injected into said column. This hydrazine feed is preferably made at the re-circulation loop; a duct 18 thus introduces an appropriate quantity of hydrazine N₂H₄. The quenching reactor 6 is thus fed with a solution of hydrochloric acid and hydrazine. The hydrazine may thus be introduced in the form of an independent aqueous solution, for example via a duct 19.

The hydrazine (in the form of hydrate) reacts with the elementary chlorine according to the following reaction scheme:

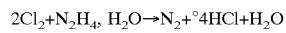

$2Cl_2 + N_2H_4,\ H_2O \rightarrow N_2 + {}^\circ 4HCl + H_2O$ or, if the water molecule is disregarded:

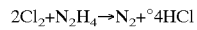

$2Cl_2 + N_2H_4 \rightarrow N_2 + {}^\circ 4HCl$

The quantity of hydrazine introduced may be in a slight stoichiometric excess in relation to the chlorine (for example, between 1 and 1.2 times the stoichiometric amount). The quantity of hydrazine in the re-circulation loop or the duct 19 is between 10 and 1000 mg/l, and preferably between 50 and 500 mg/l.

In the quenching reactor 6, the elementary chlorine contained in the combustion gases is therefore reduced, or even eliminated.

This introduction of hydrazine at the quenching stage is possible because the hydrazine is active even in a concentrated acid medium (such as the hydrochloric acid solution present in the re-circulation loop) and the products formed are identical to the products already present in the vent hole of the incinerator, namely N₂, HCl. The hydrazine is therefore introduced almost at the source of chlorine. This preferred embodiment offers several advantages:

- it offers the possibility of thus being able to do away with the soda column (a final scrubbing with water may be retained to eliminate any last traces of HCl).
- the 33% hydrochloric acid solution does not contain any dissolved free chlorine.
- the chlorine yield from the reclamation unit for chlorinated residues is improved (direct reclaim of chlorine as HCl and gain in HCl vis-à-vis the neutralisation of effluents in the soda column).
- the quantity of effluents is considerably lowered and in fact reduced at the single bleed of the quenching reactor 6.

the quantity of discharged salts is extremely low, or even zero.

corrosion in the unit is reduced.

The hydrazine may in fact be introduced at any point in a conventional installation, for example into the HCl column or into the last column, in place of the soda.

Figure 3:
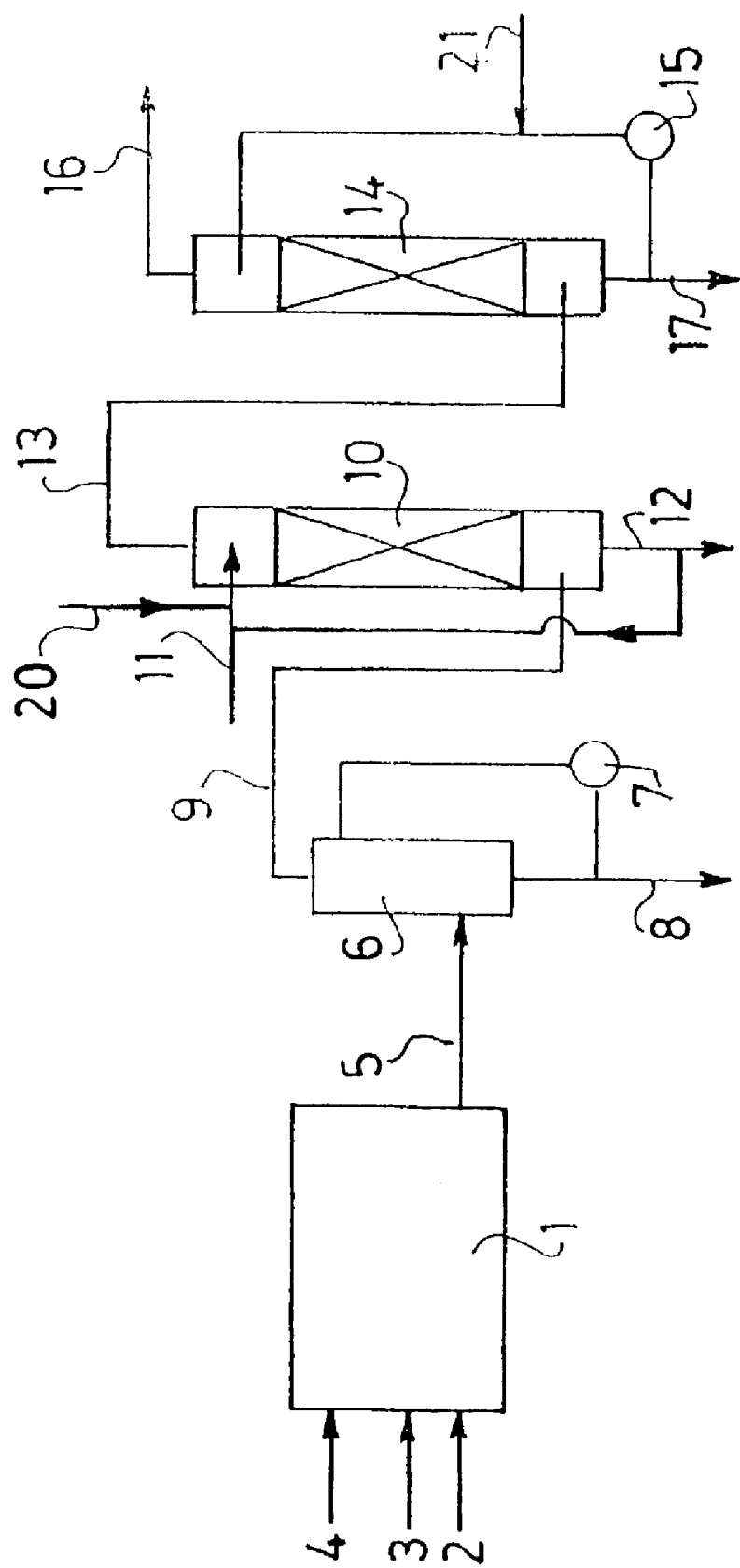
FIG. 3 is a diagram of an installation for treating chlorinated residues according to another embodiment of the invention.
Figure 4:
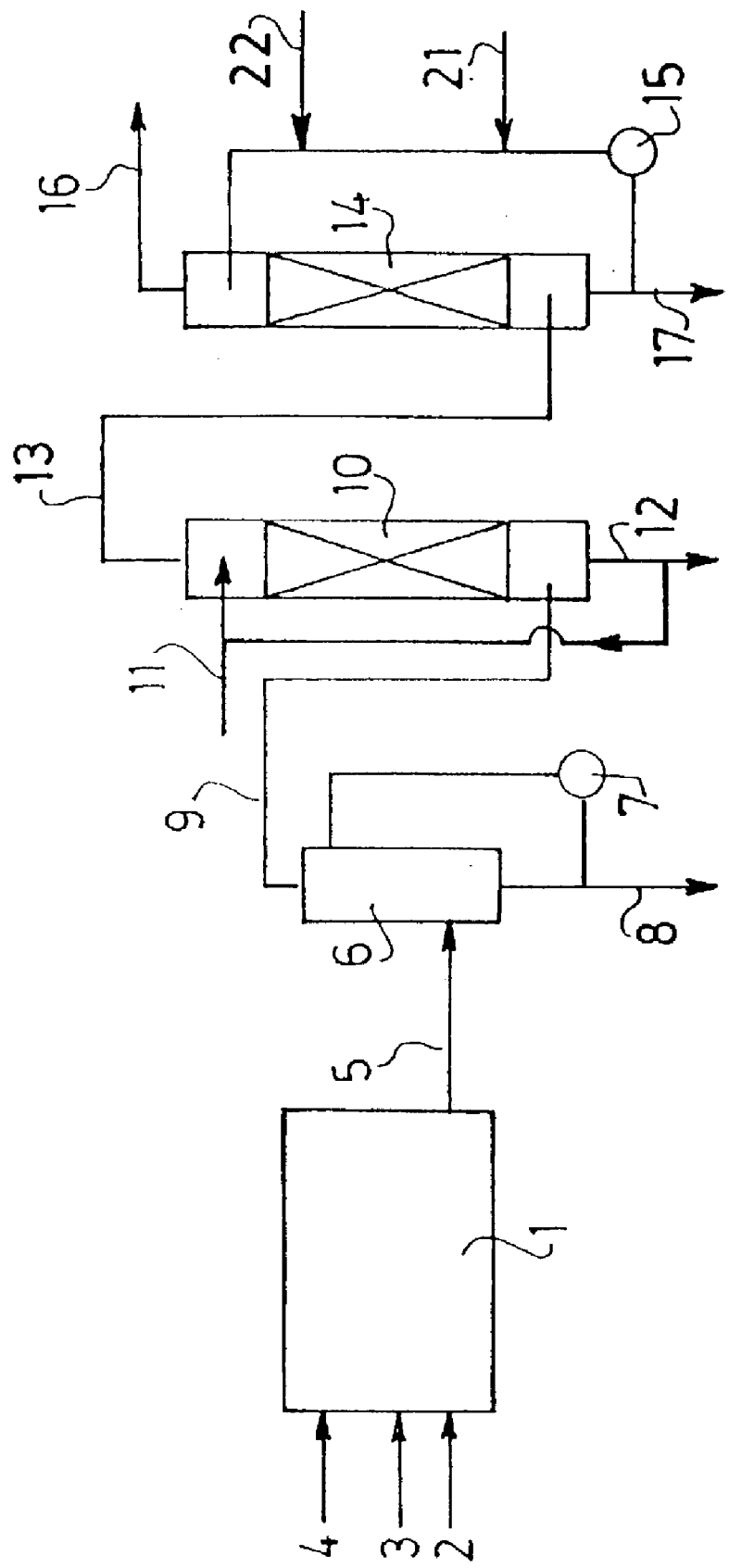
FIG. 4 is a diagram of an installation for treating chlorinated residues according to yet another embodiment of the invention.

Thus, referring to FIG. 3, a second embodiment of the invention is described. Here, the hydrazine is introduced via a duct 20 on the HCl re-circulation loop. The hydrazine then reacts with the chlorine into the HCl column; the hydrochloric acid produced is then also markedly free of dissolved elementary chlorine. Thus, referring to FIG. 4, a third embodiment of the invention is described. Here, the hydrazine is introduced via a duct 22 on the re-circulation loop of the scrubbing column 14. The soda feed may then be markedly reduced or even done away with.

In these two embodiments, the general advantages listed for the first embodiment are obtained.

The hydrazine may be introduced:

Only into the quenching reactor, or

Only into the HCl column, or

Only into the soda column, or

Into the quenching reactor and the HCl column, or

Into the quenching reactor and the soda column, or

Into the HCl column and the soda column, or

Into the quenching reactor and the HCl column and the soda column.

Moreover, whichever embodiment of the invention is chosen, a kettle may be installed between the furnace 1 and the quenching reactor 6.

The invention encompasses the treatment of gaseous and liquid effluents.

In the case of gaseous effluents, these contain the halogen, for example chlorine in the form of $Cl_2$, to be eliminated, in combination with other gaseous compounds, such as $H_2O$, HCl, $CO_2$ and $O_2$. This gaseous effluent is then brought into contact with hydrazine, especially in its hydrate form, in aqueous solution (which may be an acid solution) or, if necessary, in an alcohol solution.

In the case of liquid effluents, these are aqueous acid solutions containing the dissolved gas, these traces of gas contaminating the acid solution. This acid solution is brought into contact with a hydrazine solution, which may be simply aqueous or acid, with an acid content of between 15 and 40%, advantageously between 20 and 35%.

The hydrazine used is advantageously (but in nowise limitatively) used in its hydrate form.

The following example illustrates the invention but is in nowise limitative:

EXAMPLES

Figure 5:
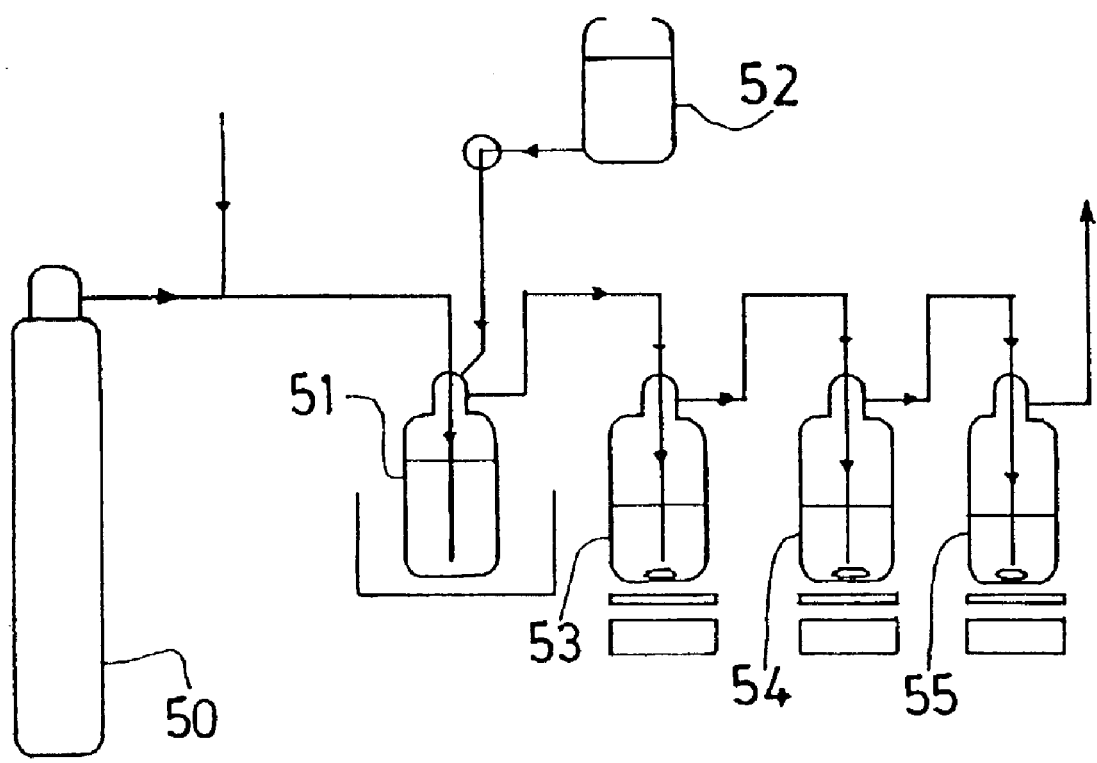
FIG. 5 shows the installation used for carrying out the examples.

Tests were carried out on the installation shown in FIG. 5, in the following manner.

A gaseous mixture composed of nitrogen and chlorine was first prepared in a cylinder 50, called the standard. This mixture was then introduced continuously (pure or diluted with nitrogen) into a bubble scrubber 51 containing a 36% HCl solution maintained at 60° C. with a water bath. This solution also contained hydrazine, whose initial concentration was around 200 to 300 ppm. This concentration was maintained constant by continuously adding a dilute hydrazine hydrate solution from a flask 52.

The gases coming out of the bubble scrubber 51 were conveyed towards a series of traps (first a water trap 53 for HCl, then soda traps 54 and 55 for the chlorine) in order to enable an overall assessment of the test to be made.

a) High Chlorine Content

In a first series of tests, a mixture of nitrogen and chlorine, whose chlorine content was 15% by weight in relation to the total weight of the mixture, was introduced at a rate of 1.12 l/h into the bubble scrubber 51 containing initially 243 g of 36% HCl and 309 ppm of hydrazine hydrate $N_2H_4$, $H_2O$.

Simultaneously, an aqueous solution of 0.2 mol/l of hydrazine hydrate was also introduced into the bubble scrubber, at a rate of 7.25 ml/h.

After 4 hours operation, the material balance was as follows:

| | |
|---|---|
| Chorine introduced (theoretical) | 14 mmoles |
| Hydrazine remaining in the bubble scrubber 51 | 200 ppm |
| Hydrazine hydrate consumed | 6.5 mmoles |
| i.e., quantity of chlorine reduced | 13 mmoles |
| Chlorine in the soda trap 54 | 0.1 mmoles |
| Chlorine in the soda trap 55 | 0.04 mmoles |

The degree of chlorine reduction (reduced chlorine/total measured chlorine) was therefore 98.9%.

b) Low Chlorine Content

In a second series of tests, a mixture of nitrogen and chlorine, whose chlorine content was 15% by weight in relation to the total weight of the mixture, was introduced at a rate of 1.22 l/h into the bubble scrubber 51, but after being diluted by mixing with a 250 l/h flow of nitrogen, which represents a chlorine concentration of around 300 ppm in the gas flow.

The bubble scrubber initially contained 243 g of 36% HCl and 309 ppm of hydrazine hydrate $N_2H_4$, $H_2O$.

Simultaneously, an aqueous solution of 0.2 mol/l of hydrazine hydrate was also introduced into the bubble scrubber, at a rate of 12.5 ml/h.

After 3 hours operation, the material balance was as follows:

| | |
|---|---|
| Chorine introduced (theoretical) | 11 mmoles |
| Hydrazine remaining in the bubble scrubber 51 | 700 ppm |
| Hydrazine hydrate consumed | 5.55 mmoles |
| i.e., quantity of chlorine reduced | 11.1 mmoles |
| Chlorine in the soda trap 54 | 0.08 mmoles |
| Chlorine in the soda trap 55 | no chlorine |

The degree of chlorine reduction (reduced chlorine/total measured chlorine) was therefore 99.3%.

c) Presence of Oxygen

A third series of tests were performed by introducing 250 l/h of air only into the bubble scrubber 51, containing 36% HCl and 300 ppm of hydrazine.

After 3 hours operation, the total quantity of hydrazine introduced was recovered, which shows that, under these conditions, the oxygen from the air does not manage to oxidise the hydrazine hydrate in solution in the HCl.

The conditions of the aforesaid tests were more unfavourable than those that exist in an industrial installation since a single bubble scrubber 51 was used, whereas in an industrial installation, in place of the bubble scrubber 51, an absorption column is used, which allows better contact between the compounds and, as a consequence, a higher level of reduction of the chlorine.

Obviously, the present invention is not limited to the aforesaid embodiments, but that numerous variants are easily accessible to those skilled in the art.

What is claimed is:

1. A process for reclaiming halogenated residues, comprising:

combusting halogenated residues in the presence of oxygen and water in a combustion furnace;

quenching a gaseous effluent containing elementary halogen from the combustion furnace;

passing the gaseous effluent in a HCl column;

bringing the gaseous effluent into contact with hydrazine; and optionally, scrubbing the gaseous effluent with water or soda, wherein the hydrazine is brought into contact with the gaseous effluent during quenching, or in the HCl column.

2. A process according to claim 1, in which the hydrazine is in an aqueous hydrazine solution.

3. A process according to claim 2, in which the aqueous hydrazine solution contains a hydrohalogenic acid solution.

4. A process according to claim 3, in which the aqueous hydrazine solution is brought into contact with the gaseous effluent during quenching.

5. A process according to claim 2, in which the aqueous hydrazine solution is brought into contact with the gaseous effluent during quenching.

6. A process according to claim 2, in which the aqueous hydrazine solution is brought into contact with the gaseous effluent in the HCl column.

7. A process according to claim 1, in which the hydrazine is brought into contact with the gaseous effluent during quenching.

8. A process according to claim 1, in which the hydrazine is brought into contact with the gaseous effluent in tie HCl column.

9. A process according to claim 1, comprising the optional water or soda scrubbing and in which hydrazine is introduced during scrubbing.

10. A process according to claim 1, comprising the optional water or soda scrubbing and in which an aqueous hydrazine solution is introduced during scrubbing.

11. A process according to claim 1, in which the elementary halogen is chlorine.

12. A process for reclaiming halogenated residues, comprising:

combusting halogenated residues in the presence of oxygen and water in a combustion furnace;

quenching a gaseous effluent containing elementary halogen from the combustion furnace;

passing the gaseous effluent in a HCl column;

bringing the gaseous effluent into contact with hydrazine, wherein the quantity of hydrazine is between 0.2 and 2 times a stoichiometric amount of the elementary halogen; and optionally, scrubbing the gaseous effluent with water or soda.

13. A process according to claim 12, in which the hydrazine is in an aqueous hydrazine solution.

14. A process according to claim 13, in which the aqueous hydrazine solution contains a hydrohalogenic acid solution.

15. A process according to claim 13, comprising the option water or soda scrubbing and in which an aqueous hydrazine solution is introduced during scrubbing.

16. A process according to claim 12, in which the hydrazine is brought into contact with the gaseous effluent during quenching.

17. A process according to claim 12, in which the hydrazine is brought into contact with the gaseous effluent in the HCl column.

18. A process according to claim 12, comprising the option water or soda scrubbing and in which hydrazine is introduced during scrubbing.

19. A process according to claim 12, in which the elementary halogen is chlorine.

20. A process for reclaiming halogenated residues, comprising:

combusting halogenated residues in the presence of oxygen and water in a combustion furnace;

quenching a gaseous effluent containing elementary halogen from the combustion furnace;

passing the gaseous effluent in a HCl column;

bringing the gaseous effluent into contact with hydrazine; and optionally, scrubbing the gaseous effluent with water or soda.

* * * * *

UNITED STATES PATENT AND TRADEMARK OFFICE
CERTIFICATE OF CORRECTION

PATENT NO.    : 6,858,194 B2
DATED         : February 22, 2005
INVENTOR(S)   : Philippe Leduc It is certified that error appears in the above-identified patent and that said Letters Patent is hereby corrected as shown below:

Column 7,
Line 31, reads "tie" should read -- the --

Column 8,
Lines 17 and 27, reads "option" should read -- optional --

Signed and Sealed this

Twenty-eighth Day of June, 2005

JON W. DUDAS
*Director of the United States Patent and Trademark Office*